No. 651,471. Patented June 12, 1900.
P. F. RIBBE.
ELECTRODE FOR SECONDARY BATTERIES.
(Application filed Feb. 28, 1899.)
(No Model.)
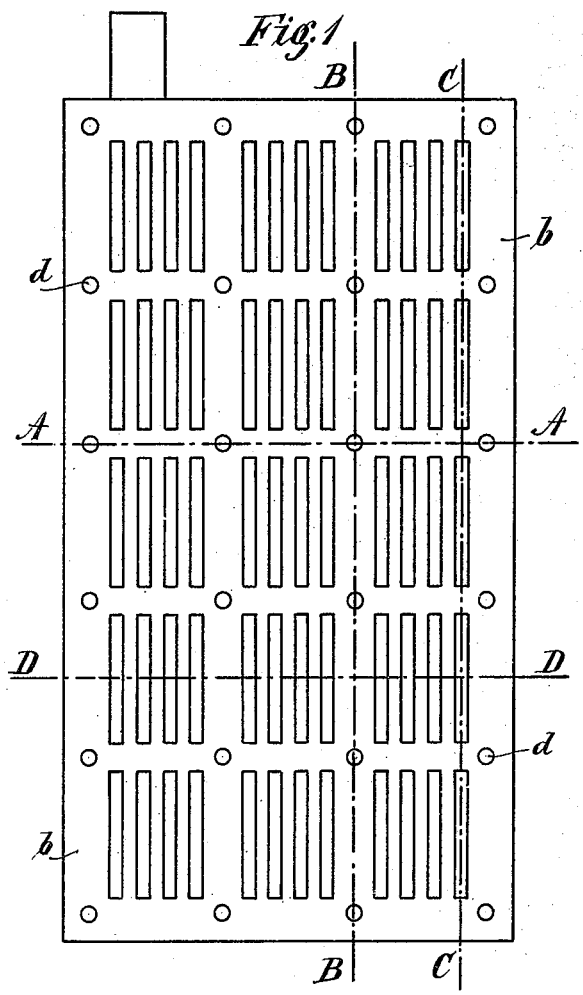
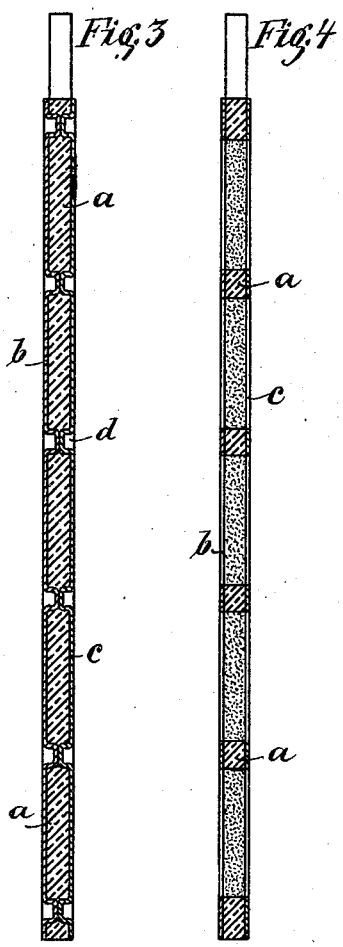
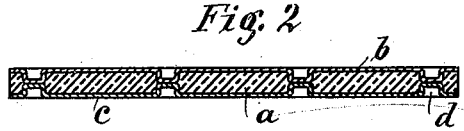
WITNESSES:
Ella L. Giles
INVENTOR
Paul Ferdinand Ribbe
BY
Richardson
ATTORNEYS
THE NORRIS PETERS CO., PHOTO-LITHO., WASHINGTON, D. C.

UNITED STATES PATENT OFFICE.

PAUL FERDINAND RIBBE, OF CHARLOTTENBURG, GERMANY.

ELECTRODE FOR SECONDARY BATTERIES.

SPECIFICATION forming part of Letters Patent No. 651,471, dated June 12, 1900.

Application filed February 28, 1899. Serial No. 707,190. (No model.)

*To all whom it may concern:*

Be it known that I, PAUL FERDINAND RIBBE, engineer, residing at the city of Charlottenburg, near Berlin, in the Kingdom of Prussia, German Empire, have invented certain new and useful Improvements in Electrodes for Secondary Batteries, of which the following is a specification.

The present invention relates to electrodes for secondary batteries, in which the active material is inserted in a perforated lead plate and is prevented from falling out by insulating-plates covering the aforesaid lead plates. These latter are supported by forming apertures in the lead plate, into which the plates are bent in from both sides, so that the places where they are in contact can be covered with a suitable cement and the plates be thus joined together. The cover-plates also have perforations, the edges of which serve as retaining-pieces for the active material inserted in the hollows of the lead plate.

The invention forming the object of the present application is illustrated in the accompanying drawings, in which—

Figure 1 is a front view of the plate. Fig. 2 is a section on the lines A A of Fig. 1. Fig. 3 is a section on the lines B B of Fig. 1. Fig. 4 is a section on the lines C C of Fig. 1. Fig. 5 is a section on the lines D D of Fig. 1.

The stamped lead plate $a$ is divided into separate areas and has a number of narrow perpendicular bars, but only a few thick ones in the horizontal direction. The perpendicular bars are of quadrangular section and arranged diamondwise, so that one diagonal is equal to the thickness of the plate. The plate is filled in the usual way with filling material, which material thus forms bodies, the section whereof is recessed in the middle and widens toward the sides. To prevent the falling out of the filling material, the lead plate is covered with plates $b\ c$ of insulating material, such as celluloid. The covering-plates are likewise constructed with perforations. Their perpendicular bars lie against the perpendicular bars of the lead plate $a$, and thus form supports for the active material in the perforations of the lead plate, while the acid has free access thereto. The plates $b\ c$ are connected in the following manner: The grating of the plate $a$ is interrupted at regular intervals, so that there is formed a connecting-space. This is then provided with an aperture, into which the plates $b\ c$ are pressed, so that they are in contact and can be suitably coated with acetone or the like, and thereby firmly cemented together.

The new electrode-plates are of very light weight, in spite of their large capacity, because the requisite strength is obtained not only by means of the lead plate, but also by means of the two insulating-plates, which are much lighter. They are therefore especially suitable for transportable accumulator-batteries, such as are used on tram-cars, motor-cars, and the like.

Having now particularly described and ascertained the nature of my said invention and in what manner the same is to be performed, I declare that what I claim is—

1. In electrode-plates the combination of a lead plate $a$, having wide bars along its edges and at intermediate points and having also smaller ribs in its body of the shape of a rhomb or square, the outer edges of all of said bars and ribs lying in the same planes with the side faces of the lead plate and two plates $b$, $c$, consisting of insulating material, said plates having perforations registering with the openings in the lead plate and said lead plate having openings through which the plates $b$ and $c$ are pressed and joined to make an integral whole.

2. In electrode-plates, the combination of a lead plate $a$, having wide bars along its edges and at intermediate points and having also smaller ribs in its body of the shape of a rhomb or square, the outer edges of all of said bars and ribs lying in the same plane with the side faces of the lead plate and two plates $b$, $c$, consisting of insulating material, said plates having perforations registering with openings in the lead plate, the said ribs serving to separate the active mass into independent swallow-tail fields, the points of the ribs lying between the openings in the plates $b$, $c$, so that portions of said plates will overhang to make four corners in which the active mass will engage, substantially as described.

In witness whereof I have hereunto set my hand in presence of two witnesses.

PAUL FERDINAND RIBBE.

Witnesses:
WOLDEMAR HAUPT,
HENRY HASPER.